Jan. 6, 1953   J. A. LAMPRECHT   2,624,498
BOTTLE CARRIER

Filed Feb. 7, 1950   3 Sheets-Sheet 1

INVENTOR.
Joseph A. Lamprecht
BY
Moses, Nolte, Crews & Berry
ATTORNEYS

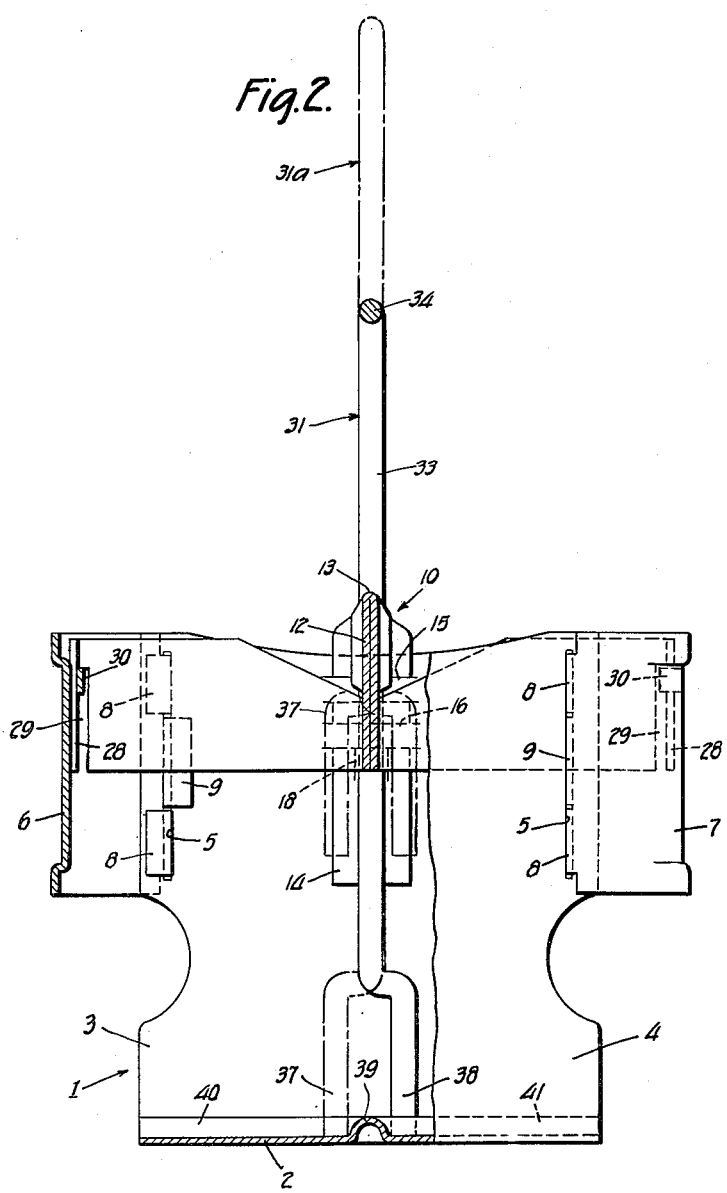

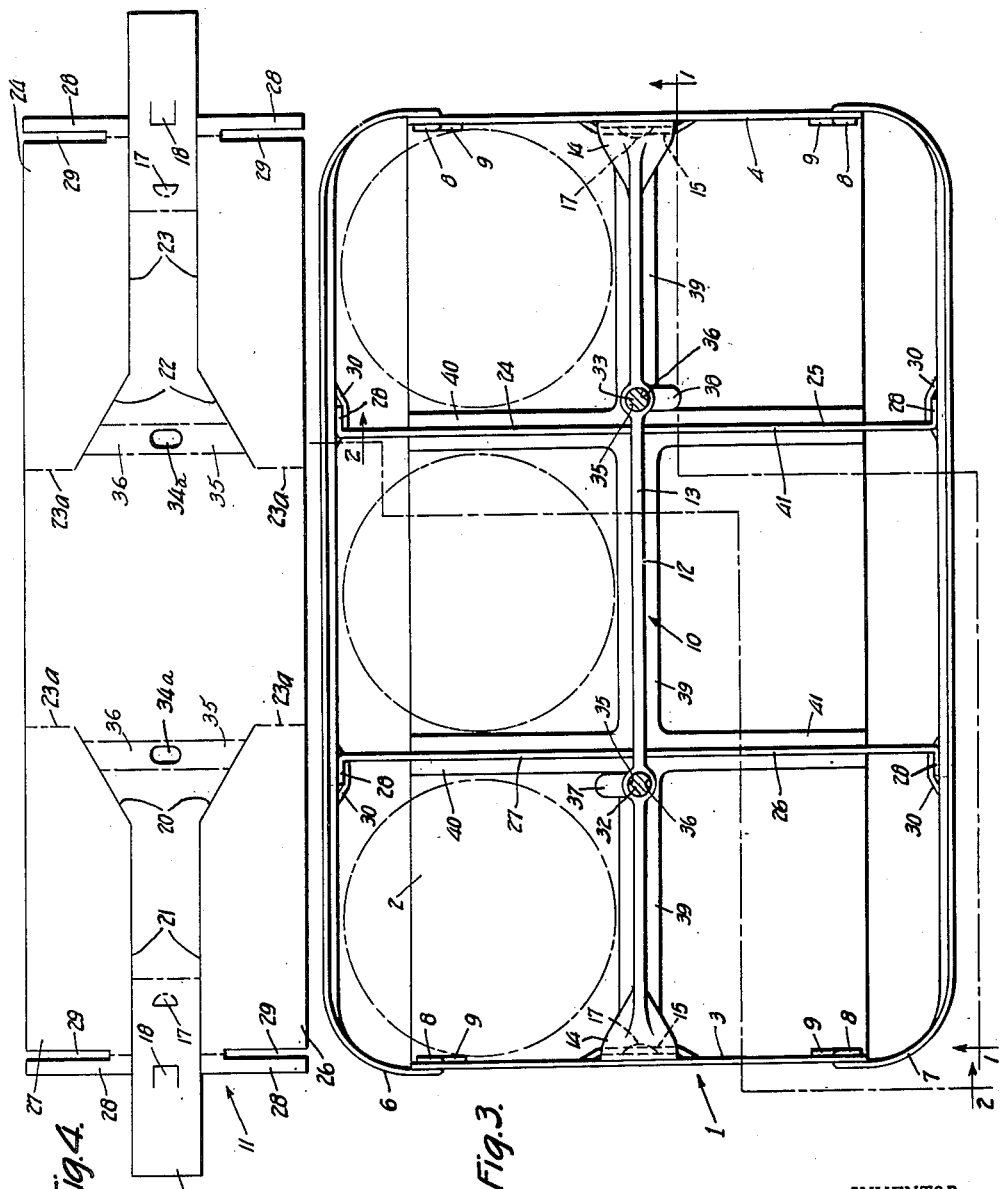

Patented Jan. 6, 1953

2,624,498

UNITED STATES PATENT OFFICE 2,624,498

BOTTLE CARRIER

Joseph A. Lamprecht, Cranford, N. J.

Application February 7, 1950, Serial No. 142,823

2 Claims. (Cl. 224—48)

This invention relates to bottle carriers and has for its primary object to provide a bottle carrier which will be economical to manufacture, light in weight, efficient in use and of rugged, durable construction.

The body of the carrier selected for illustrative disclosure is composed entirely of sheet metal, preferably of aluminum or magnesium, or a light, non-tarnishing alloy composed largely of one or both of these metals.

It is an object of the invention to provide a carrier having a separator in which the side and end walls are supported and reinforced by the separator while the separator elements are in turn supported and reinforced by the side and end walls.

It is a further object of the invention to provide a separator of unitary construction adapted to define partition walls for two rows of bottles and to have the free ends of all of its partition defining walls rigidly connected to the side and end walls of the carrier.

It is a further object of the invention to provide a separator of one-piece construction having a two-ply body portion and having opposed pairs of partition arms, the arms of each pair being struck from corresponding areas of the juxtaposed plies and turned outward into alignment with one another.

It is a further object of the invention to provide a carrier having a separator and a sheet metal base, the sheet metal base being formed with upstanding reinforcing ribs disposed substantially the same in plan as the separator for dividing the base into distinct bottle supporting areas.

It is a still further object of the invention to provide a bottle carrier having a separator and a rigid wire handle slidably mounted upon the separator, the separator being formed with handle guideways.

Other objects and advantages will hereinafter appear.

In the drawing forming part of this specification:

Fig. 2 is a sectional view taken upon the line 2—2 of Fig. 3, looking in the direction of the arrows;

Fig. 3 is a sectional view taken upon the line 3—3 of Fig. 1, looking in the direction of the arrows; and Fig. 4 is a bottom plan view of a blank, cut, partially formed and ready for folding, of which the complete separator is made.

Figure 1:
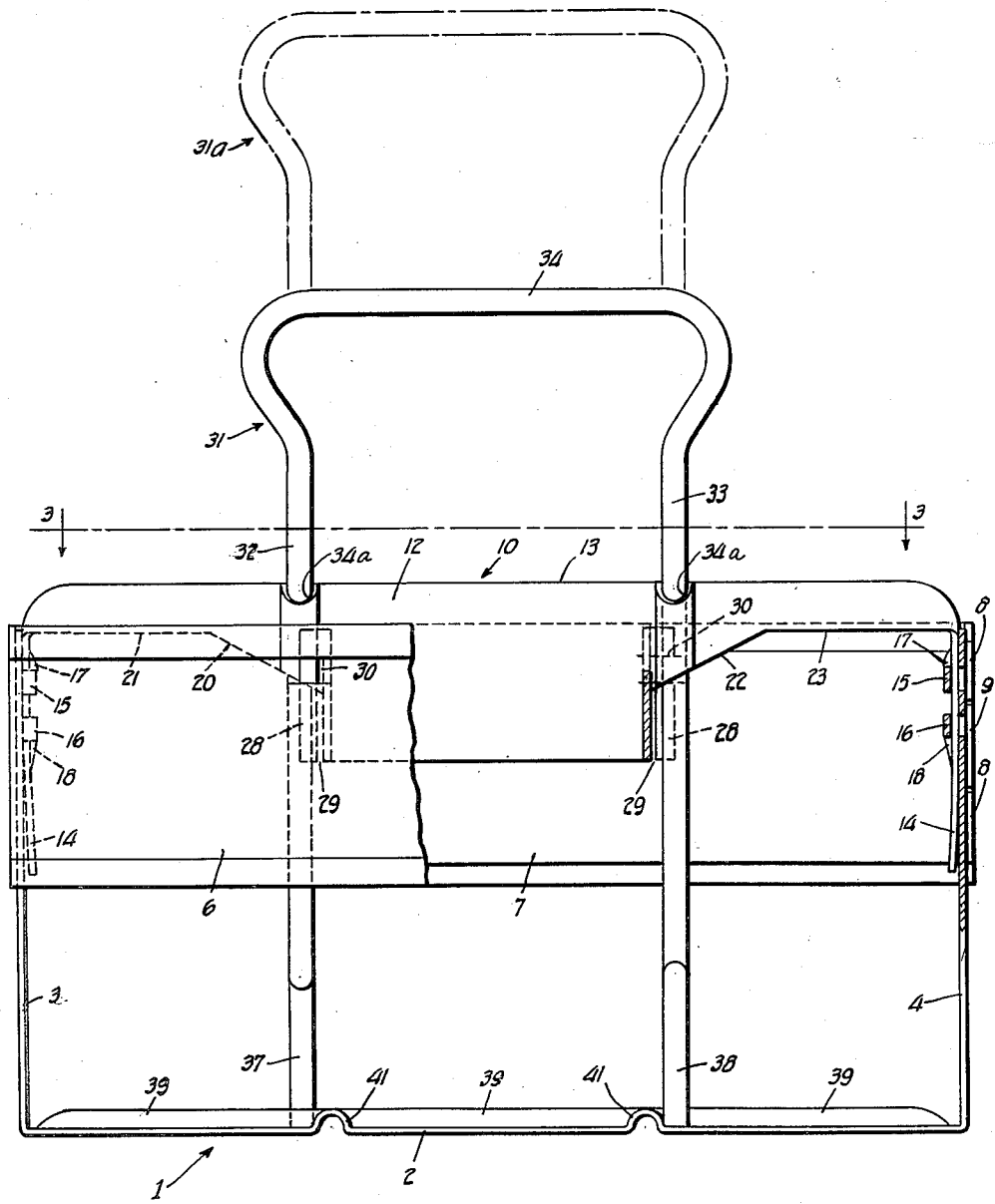
Fig. 1 is a view in side elevation, partly broken away, of a bottle carrier embodying features of the invention, the carrier handle being shown in full line in its normal or "down" position and in dot and dash lines in its extended or "carrying" position.

An illustrative carrier comprises a stirrup-like member 1 which defines a base 2, and end walls 3 and 4, the end walls being turned upward from the base.

The end walls are formed with vertical slots 5 in the upper side margins. Curved side wall members 6 and 7 have tongues 8 and 9 formed on their opposite ends. The tongues 8 and 9 are inserted inward through the slots 5 and the tongues 8 are then folded in one direction while the tongues 9 are folded in the opposite direction to unite the side wall members securely to the end walls.

The members 1, 6 and 7 combine to form a rigid basket portion of the carrier.

The side and end walls jointly support a separator 10. The separator 10 is formed from a single piece 11 (Fig. 4) of sheet metal. The separator blank is folded longitudinally to provide a central two-ply body portion 12 having a longitudinally extending folded upper edge 13. The body portion extends continuously for nearly the full length of the carrier. The ends 14 of the body portion are of single ply construction. They are folded downward into parallel relation and are adapted to pass through upper and lower straps 15 and 16 which are displaced inward from each of the end walls 3 and 4.

Each of the ends 14 is formed with an inwardly displaced stop 17 which engages the upper edge of the associated upper strap 15 to limit downward movement of the end member 14. Each of the end members 14 is also provided with an inwardly displaced, upwardly directed, spring tongue 18 engageable with the lower edge of the associated lower strap 16 to prevent withdrawal of the separator from the end wall.

The plies of the body member 12 are cut through at one end along a sloping line 20 and a connecting horizontal line 21 and at the opposite end along a sloping line 22 and a connecting horizontal line 23. This provides bendable areas in the juxtaposed plies which are folded away from one another and from the central body portion 12 about fold lines 23a to provide partition-forming side arms 24, 25, 26 and 27.

Each of the side arms has an end flange 28 at its outer end which is separated from the main body of the arm by a slot 29 that extends upward through the lower edge of the arm to a point not far from the upper edge thereof. Each flange therefore constitutes a downwardly directed tongue which is adapted to be inserted downward through an associated strap 30. The straps 30 are displaced inward from the side wall members 6 and 7. The tongues formed by the flanges 28 are adapted to be inserted in place simultaneously with the insertion of the end members 14 through the straps 15 and 16 of the end walls 3 and 4.

With the construction described, the separator serves strongly to reinforce the side walls and the end walls against collapse and distortion and is, in its turn, strongly supported by the side and end walls themselves. Since the withdrawal of the separator from the end walls is prevented by the tongues 18, the carrier and its contents are adapted to be supported through the separator.

A rigid wire handle 31 is slidingly mounted on the separator. The handle comprises parallel legs 32 and 33 which are connected by a hand grip portion 34. Parallel guideways for the handle legs are provided in the central body portion 12 of the separator by the formation of openings 34a through the upper folded edge of the separator and pressed, complementary opposed grooves 35 and 36 in line with each of said openings. (Compare Figs. 1 and 3.) In Fig. 4 the areas in which the grooves are to be formed are designated 35 and 36 although the grooves are not yet present.

The legs 32 and 33 have their lower ends formed with oppositely offset portions 37 and 38 which serve as stops to limit upward movement of the handle relative to the separator. The offsets are formed after the legs have been inserted through the formed separator. When the carrier is picked up by the handle, the handle slides to the extended position illustrated in dot and dash lines at 31a in Figures 1 and 2, at which point the stop portions 37 and 38 come into engagement with the separator. Further lifting of the handle serves to lift the separator, and the separator in turn lifts the carrier body and its contents.

It will be observed that the guideways formed through the separator are located in proximity to the partition-forming side arms. As a consequence, the legs of the handle are caused to travel up and down in locations well removed from the bottle sides so that their movements are not interfered with by the bottles.

It is desirable that reinforcing ribs be provided in the base or bottom wall of the carrier, and such ribs are provided in the form of an upstanding longitudinal central rib 39 and upstanding transverse ribs 40 and 41. It is a feature of the present invention that the ribs 39, 40 and 41 define an arrangement corresponding in plan with the arrangement of the separator. The ribs therefore serve not only as reinforcements but also as dividers or locators for the bottles which cause the base to be divided into distinct, substantially equal, bottle supporting areas, and which serve to keep the bottles in good order in the carrier and out of contact with one another. This protects the bottles against breakage by impact.

The bottle carrier described is very light in weight, but is at the same time of a rigid and durable construction. It is adapted to be used again and again, and is not likely to be knocked out of shape by any treatment to which it is ordinarily subjected in use.

I have described what I believe to be the best embodiment of my invention. I do not wish, however, to be confined to the embodiment shown, but what I desire to cover by Letters Patent is set forth in the appended claims.

I claim:

1. In a sheet metal bottle carrier, the combination with bottom, side and end walls, of a separator, each of said side and end walls being formed with inwardly displaced straps for anchoring the separator, and the separator including a central body portion and partition-forming side arms disposed at opposite sides of the body portion and integral therewith, each of said arms including a downwardly directed tongue interfitted with one of the side wall straps, and the ends of the body portion being directed downward and interfitted with the end wall straps.

2. In a sheet metal bottle carrier, the combination with bottom, side and end walls, of a separator, each of said side and end walls being formed with inwardly displaced straps for anchoring the separator, and the separator including a central body portion and partition-forming side arms disposed at opposite sides of the body portion and integral therewith, each of said arms including a downwardly directed tongue interfitted with one of the side wall straps, and the ends of the body portion being directed downward and interfitted with the end wall straps, said ends of the body portion being provided with inwardly offset upwardly directed tongues cooperative with the end wall straps to prevent separation of the separator from the carrier end walls, and a carrier handle secured upon the separator.

JOSEPH A. LAMPRECHT.

REFERENCES CITED

The following references are of record in the file of this patent:

UNITED STATES PATENTS

| Number | Name | Date |
| --- | --- | --- |
| 907,912 | Stock | Dec. 29, 1908 |
| 2,414,708 | Bassichis | Jan. 21, 1947 |
| 2,441,834 | Morse | May 18, 1948 |
| 2,443,967 | Smith | June 22, 1948 |
| 2,525,633 | Arnett | Oct. 10, 1950 |
| 2,552,361 | Acton | May 8, 1951 |